Nov. 28, 1933.  B. W. FREEMAN ET AL  1,937,195
MARKING AND IMPRESSION DIE AND PROCESS OF
ORNAMENTING AND MARKING SHOE UPPERS
Filed Aug. 16, 1929    5 Sheets-Sheet 4

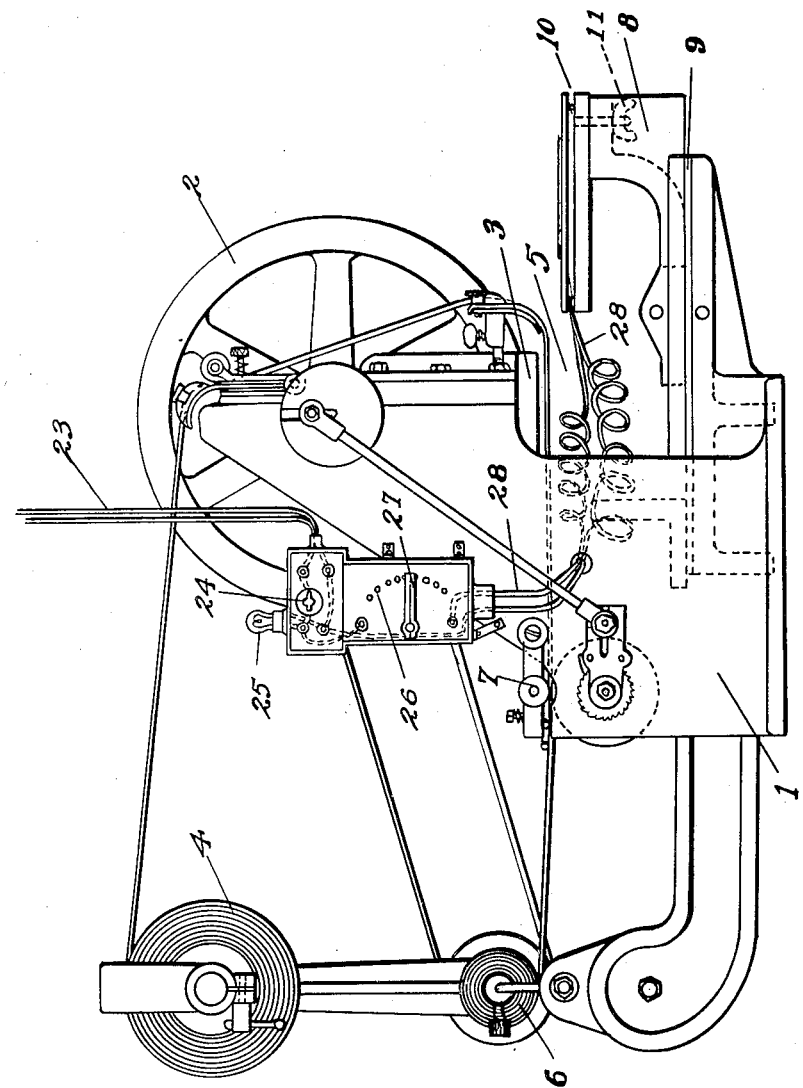

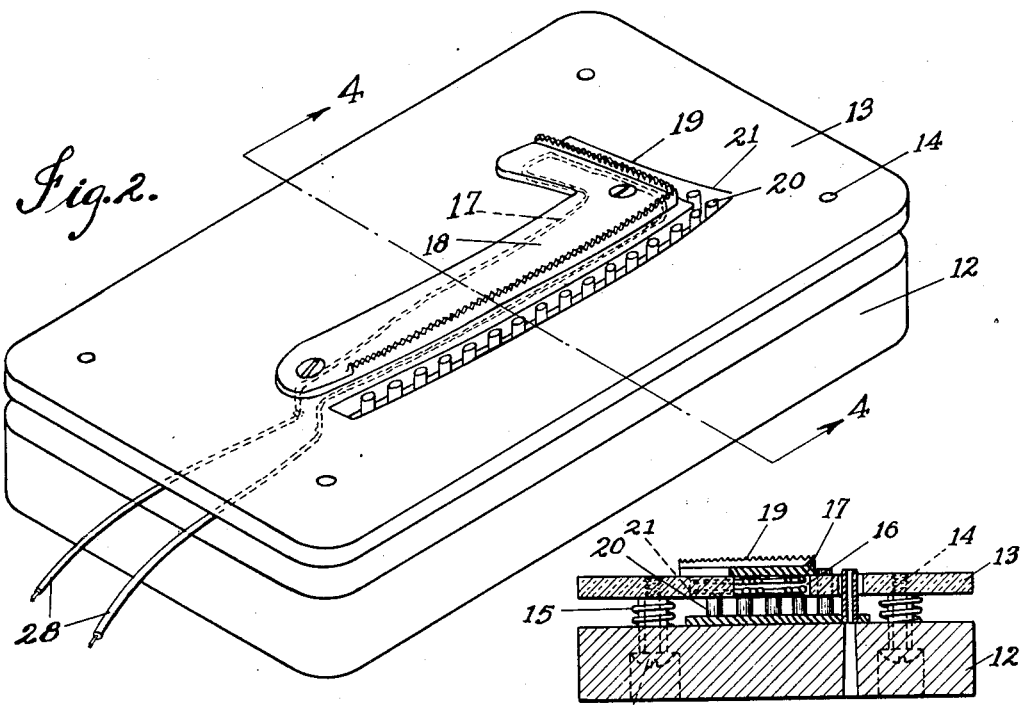
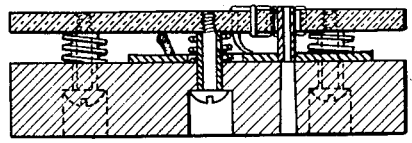
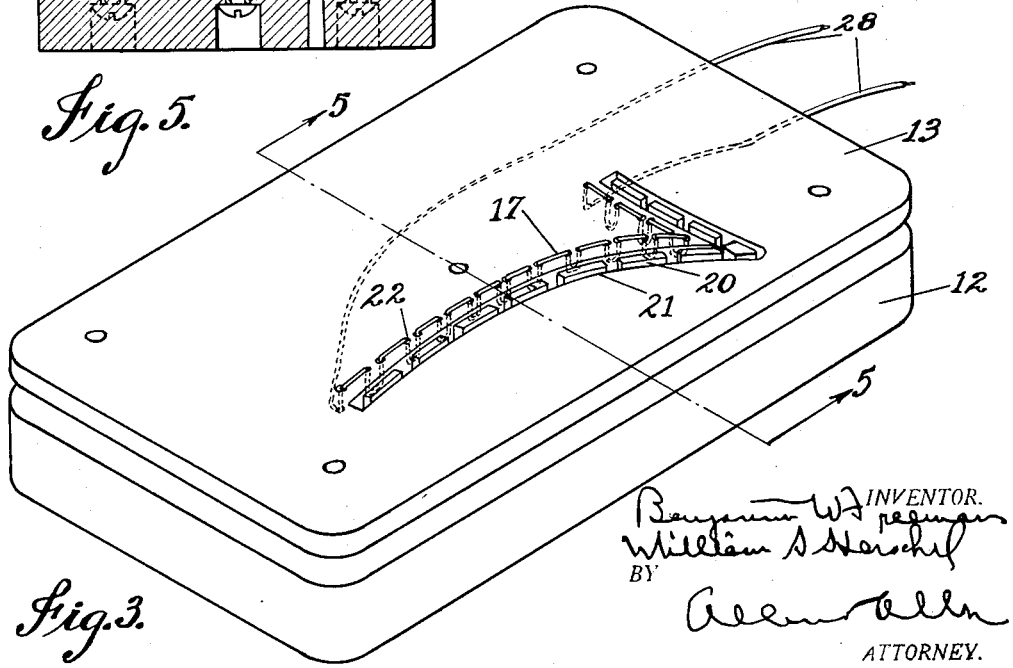

INVENTOR.
BY
ATTORNEY.

Nov. 28, 1933.   B. W. FREEMAN ET AL   1,937,195
MARKING AND IMPRESSION DIE AND PROCESS OF
ORNAMENTING AND MARKING SHOE UPPERS
Filed Aug. 16, 1929   5 Sheets-Sheet 5

Patented Nov. 28, 1933

1,937,195

UNITED STATES PATENT OFFICE 1,937,195

MARKING AND IMPRESSION DIE AND PROCESS OF ORNAMENTING AND MARKING SHOE UPPERS

Benjamin W. Freeman, Cincinnati, Ohio, and William S. Herschel, St. Louis, Mo., assignors to The Louis G. Freeman Company, Cincinnati, Ohio, a corporation of Ohio Application August 16, 1929. Serial No. 386,266

14 Claims. (Cl. 101—27)

Our invention relates to ornamenting and impressing dies for use in the manufacture of shoes and to a novel process for marking and ornamenting shoe uppers coincidently.

In the Freeman Patent No. 1,681,033 there is disclosed a cut-out machine in which shoe uppers are placed on a support which is moved under a pressure plate which forces the shoe uppers or selected parts thereof into engagement with ornamenting dies. It has been proposed to use marking or impressing dies with this type of machine, and while we do not limit ourselves to the use of the novel marking dies described herein to this type of machine, and while we may use inverted dies engaging the work from above, a discussion of the difficulties in using the type of dies which have been heretofore used with this type of machine, will be significant of the scope of our invention.

In the ordinary marking die, ink is applied to the surface of the die and the die is pressed down against the work thereby receiving the marking, for example to show where the stitching should be applied. In a combination marking and cut-out die ink is not used, and the only impression left on the shoe element is the depressed pattern which is sunk into the surface of the leather.

In using leather of variable thickness, standard dies which do not allow for variation in thickness have therefore had a limited field of usefulness. If the leather is thick, a die made for thin leather will make too heavy an impression, and if the die is made for thick leather, no marking at all will result on thin leather. Further, there are a wide variety of leathers such as embossed leather, snake and alligator finished leather, kid and the like, which cannot be properly marked with the impression dies heretofore used.

It is an object of our invention to heat the marking part of the die, so that regardless of the thickness or character of the leather, a readily visible pattern such as that along which the stitching is to be applied, will result.

It is our object to provide various means for heating a marking or impression die such, for example, as by weaving a resistance wire through an insulated stripper plate of an ornamenting die or by providing a heating chamber heated with a resistance unit underneath the impression die. It is further our object to provide means for varying the degree of heat to which the impression die or wire is subjected, so that there will be no danger of overheating the die or wire and burning the leather. It is our object, especially when the marking or impression device forms a part of the work support, to insulate and so position the heated marker that it does not touch the work except during the impressing operation, and that the support upon which the work rests is not heated so as to mar or in any way damage the work.

A still further object is the provision of a die and means for heating which will indent a shoe part with imitation stitching. While an unheated die will impress certain kinds of leather with imitation stitch marks, if the die is heated, a permanent indentation is effected in all leathers which will not tend to smooth out and thus be eradicated.

The above and other objects to which reference will be made in the ensuing disclosure we accomplish by that certain combination and arrangement of parts of which we have illustrated several embodiments of our invention.

In the drawings:

Figure 1 is a side elevation of a cut-out machine with a marking and impressing die of a type carried by the stripper of an ornamenting die mounted on an anvil support and adapted to be moved in under the pressure platen so that the marking operation may be proceeded with in the same manner as cut-out work is usually accomplished.

Figure 2 is a perspective view of one type of die.

Figure 3 is a perspective view of another type of die.

Figure 4 is a sectional view of the die shown in Figure 2 taken along the lines 4—4.

Figure 5 is a sectional view of the die shown in Figure 3 taken along the lines 5—5.

Figure 6:
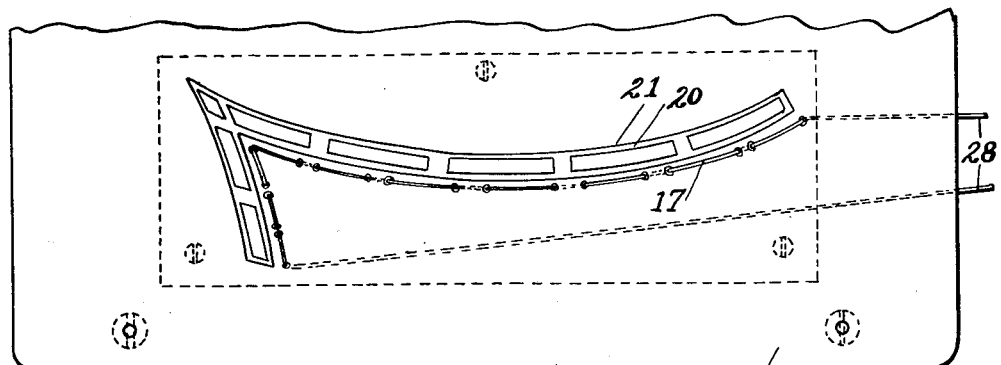
Figure 6 is a plan view of the die assembly shown in Figure 3.
Figure 7:
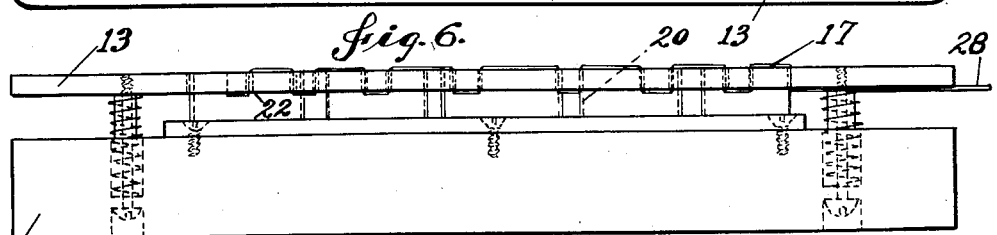
Figure 7 is a side elevation of the die assembly shown in Figure 6.
Figure 8:
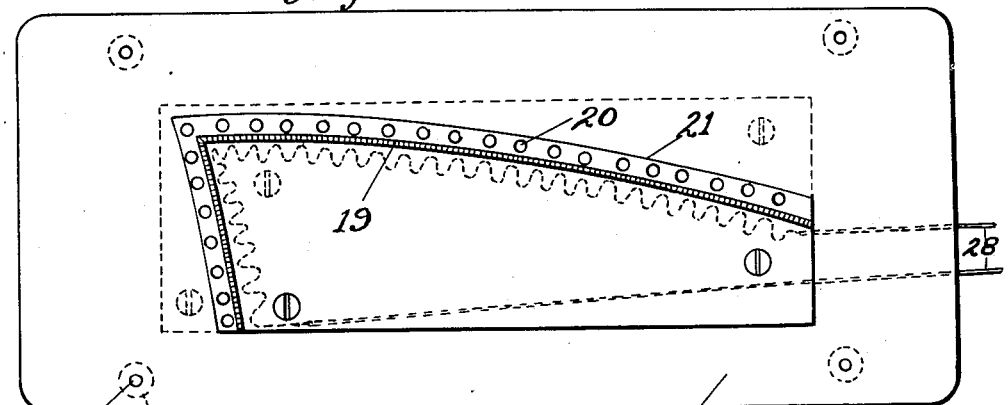
Figure 8 is a plan view of the die assembly shown in Figure 2.
Figure 9:
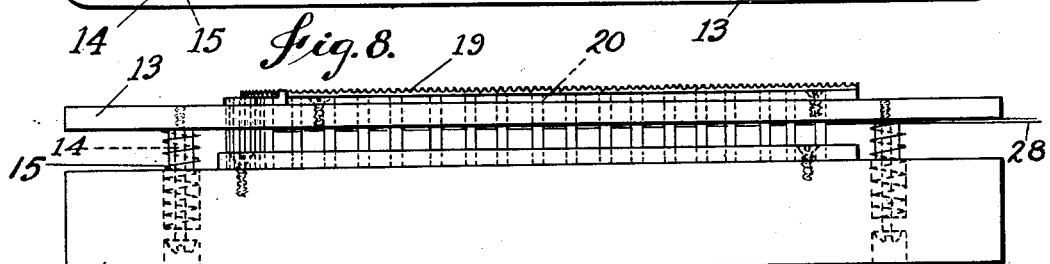
Figure 9 is a side elevation of the die assembly shown in Figure 8.
Figure 10:
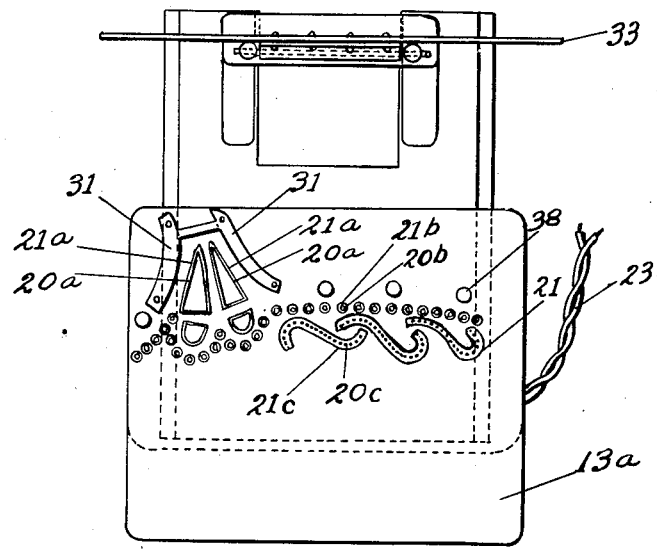
Figure 10 is a plan view of a die assembly in which cut out dies, perforating dies, and heated marking or impression dies are mounted on a single die support with a stripper plate carrying solid gauges, and a mask having means for insuring proper registry with the die and marker also included in the combination.
Figure 11:
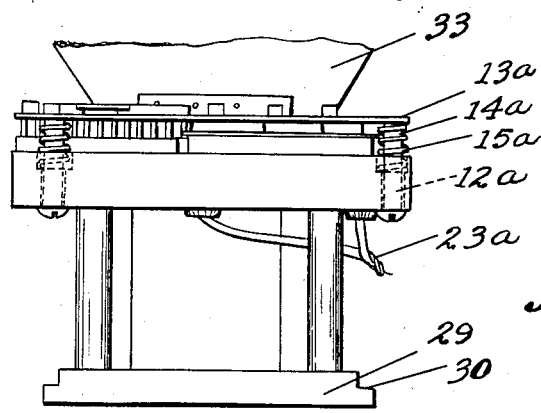
Figure 11 is a front elevation of the assembly shown in Figure 10.

Referring first to the general assembly shown in Figure 1, the cut-out machine has a supporting frame 1 with a fly-wheel 2 mounted therein. A reciprocating plunger 3 is driven from the fly-wheel by a crank. Backing is fed from a supply 4 through the work space 5 and taken up on a rewind roll 6, being moved through the work space by web feeding mechanism indicated at 7. The general features of the machine are so fully described in the Patent No. 1,681,033, that it is not thought necessary to again go into specific details describing the construction of the machine.

There is also shown an anvil type support 8 movable along slideways 9 to a position under the pressure plunger. Thus, the operator may position the work and then move the support into operating position.

The marking and impressing die is indicated generally at 10. The die unit may be mounted on the support in desired manner, as by a thumb screw 11.

The die unit illustrated in Figures 2, 4, 8 and 9 has a base support 12 on which is mounted a stripper plate 13 preferably of non-conductive material. The stripper plate has pins 14 extending into the base 12, and springs 15 force the stripper upwardly after the marking operation is complete. Within the stripper plate there is a channel 16 preferably filled with some non-conductive filler such as asbestos and a resistance wire 17 is extended through the channel. Above the channel is mounted the imitation stitch marking die, having a base 18 and upwardly extending serrations 19 which perform the marking and indenting operation. The perforating die in this unit has circular upstanding cutting edges 20 which are exposed through openings 21 in the stripper plate.

The work to be ornamented and marked is adjusted in position of the stripper plate and moved in under the plunger where, with the depression of the plunger, the work is carried into engagement with both the impression and the cutting dies. It will, of course, be entirely feasible to use a mask for holding down and assisting in the positioning of work with the die unit herein described in accordance with the teaching of Patent No. 1,681,033.

In the die unit illustrated in Figures 3, 5, 6 and 7 the combination of parts is the same. There is a base 12 having a stripper plate 13 mounted resiliently in the base with pins 14 and springs 15. The resistance wire 17, however, in this instance is sinuated up and down through slots 22 in the stripper and forms the marking die itself. The ornamenting die 20 is similarly exposed through openings 21 in the stripper plate, and the operation of ornamenting and marking is carried out in a similar manner.

On the cut-out machine we have indicated the current supply lines at 23 leading to a switch 24 which may have a signal light 25 in series therewith to indicate when the switch is turned on. From the switch 24 the wires extend to a rheostat 26 having a rotor 27 for adjusting the rheostat so that a desired amount of current will pass through the wires 28 to the marking die resistance unit. The heating of the marking die may thus be accurately controlled.

Figure 12:
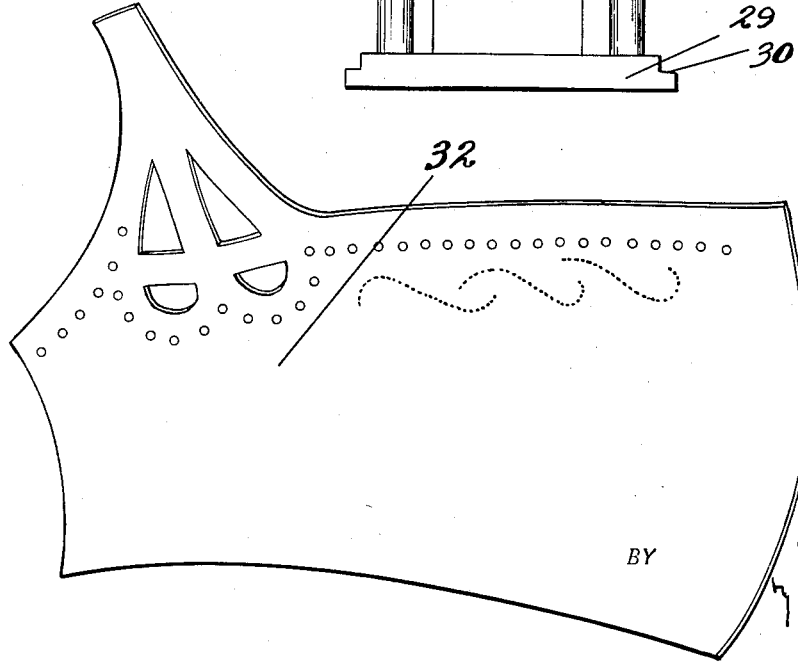
Figure 12 is a plan view of a portion of a shoe upper adapted to be decorated in the combination unit shown in Figures 10 and 11.
Figure 13:
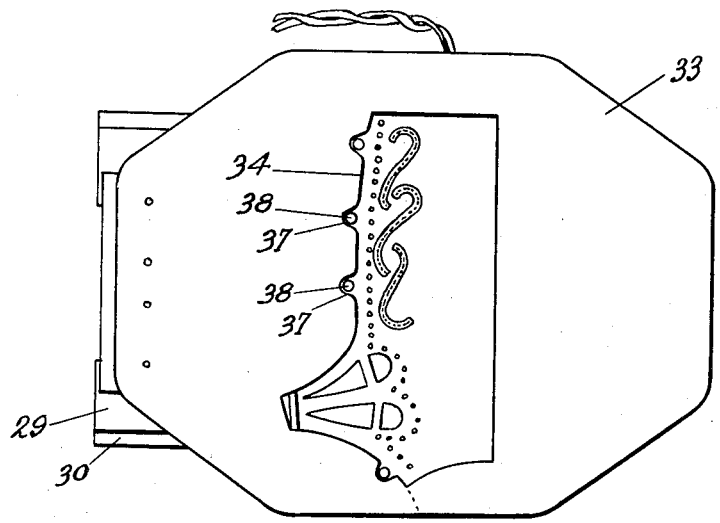
Figure 13 is a plan view of the combination shown in Figures 10 and 11 with the mask in work holding position.
Figure 14:
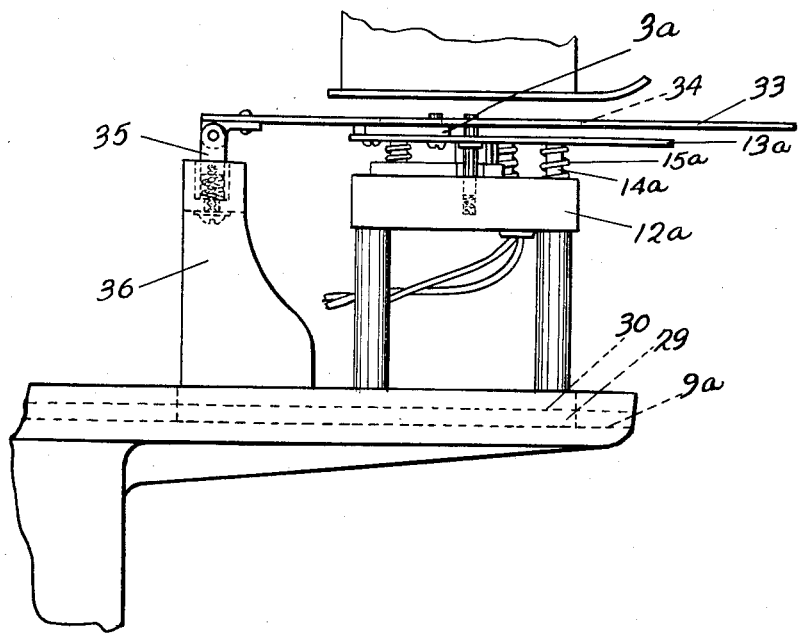
Figure 14 is a side elevation of the combination shown in Figures 10, 11 and 13 in a shoe ornamenting machine.

In the combination shown in Figures 10, 11, 13 and 14 we have shown a base 29 equipped with guiding tracks 30 which permit the unit to be moved from work operating position under the plunger 30, as shown in Figure 14, along slideways 9a in the machine frame. In this combination, we have shown a die support 12a with a stripper plate 13a having mounting pins 14a and springs 15a which press the stripper plate upwardly. The stripper plate has openings 21a for the cut-out dies 20a, openings 21b for the perforating dies 20b, and openings 21c for the marking or impression dies 20c. The dies 20a may be heated by heat units controlled by current from the wires 23a, and these dies may be suitably insulated to prevent other portions of the unit from being heated and thus marring the surface of the work. The dies 20a, 20b and 20c are mounted on the supporting member 12a. The stripper plate carries fixed gauges 3a, which may be used for assisting in the proper positioning of the work, such as we have indicated at 32 in Figure 12.

The dies 20a, 20b and 20c are mounted on the support 12a. For also assisting in the positioning of and for holding the work, we have shown a mask 33 having cut out portions 34 hinged to supporting posts 35, which are resiliently mounted in an upright support 36 extending up from the base 29. The mask may have openings 37 which register with resiliently mounted pins 38 which may be used to insure proper registry of the work with the ornamenting dies.

While in the construction shown, the marking or impression dies are associated with the ornamenting dies, and our process is carried out by performing the several operations of marking and ornamenting at the same time, we consider the use of our novel heated marking or impression die for this type of work, a new and useful invention in and of itself. The marking die may, of course, be disposed on the under surface of a mask, in which position it will function in a similar manner. Also, the die may be mounted in the plunger, and the plunger may be heated instead of heating the die itself by direct connection with electrical wire.

It will further be apparent that our invention can be applied in addition to the anvil type and flat bed type as shown, also to other modified types not shown, and it may be used both for closed upper material and for pieces laid flat on the work support.

Having thus described our invention, what we claim as new and desire to secure by Letters, Patent, is:—

1. In combination with an ornamenting die for use in a shoe ornamenting machine, stripping means and marking means mounted thereon and associated with said ornamenting die, and means for heating said marking means, said ornamenting die and marking means mounted for engagement with the same surface of a shoe part.

2. In combination with a cut-out machine for shoe uppers having ornamenting instrumentalities mounted for engagement with one surface of a shoe part, a stripper and a marking die mounted thereon associated with said ornamenting instrumentalities and means for heating said marking die, said die mounted for engagement with the same surface of the shoe part engaged by said ornamenting instrumentalities.

3. A die unit for a shoe ornamenting machine comprising an ornamenting die support, an ornamenting die thereon, and a stripper plate of non-conductive material having means for assisting in the positioning of work on said plate, said plate having a marking die associated therewith and means for heating said marking die, said dies mounted for engagement with the same surface of a shoe part.

4. In combination with the stripper plate of a shoe ornamenting die having means for assisting in the positioning of work thereon, a marking die provided with means for heating same, said ornamenting and marking die both mounted for engagement with the same surface of work.

5. A cut-out machine for shoe uppers having a movable ornamenting die associated therewith and an impression die associated with said ornamenting die provided with means for heating same, and means for assisting in the positioning of a shoe part relative to said ornamenting and impression dies.

6. In combination with an anvil for supporting a cutting die, a stripper plate, a mask and a marking die having means associated therewith for electrically heating same, said dies both facing in the same direction.

7. In combination with a shoe ornamenting machine having cutting instrumentalities for cutting decorative patterns in shoe parts, a marking die resiliently mounted relative to said cutting instrumentalities as to impress work during the ornamenting operation, and means for heating said marking die.

8. In combination with an ornamenting die having a flat stripper plate associated therewith which supports work to be ornamented, and means for assisting in the positioning of work thereon, heated marking and impression means mounted on said plate.

9. A shoe ornamenting machine provided with means for assisting in the accurate positioning of work thereon, means for cutting out ornamental patterns in work and means for burning an impression in said work in the same operation.

10. A die unit assembly provided with means for assisting in the accurate positioning of work thereon, ornamenting dies for cutting out ornamental patterns in shoe uppers and heated marking dies constructed and arranged to mark work during the cutting out operation.

11. A process for marking and ornamenting shoe uppers which consists in accurately positioning work to be ornamented in relation to elements which penetrate the work, engaging the work with said elements, and stripping the work from the penetrating elements, and burning the work with a pattern during the penetration operation.

12. In a machine for simultaneously cutting a portion from a shoe upper and indenting a stitch marking therein, a cutting die and a marking die facing in the same direction, means for pressing the upper to said dies, and means for heating the marking die to burn a readily visible stitch marking in each upper independently of pressure of the marking die on the upper, which pressure varies according to the thickness of the uppers and consequent required travel of the cutting die through the upper.

13. In a machine for simultaneously cutting a portion from a shoe upper and indenting a stitch marking therein, a cutting die and a marking die facing in the same direction, said marking die being mounted to yield in the direction opposite to that in which it faces, means for pressing the upper to the dies, and means for heating the marking die to burn a readily visible stitch marking in each upper under the varying pressures of the marking die on the upper incident to travel of the cutting die through uppers of varying thicknesses.

14. The process of simultaneously cutting a portion from a shoe upper and indenting a stitch marking therein, which comprises presenting a cutting member and a heated indenting member simultaneously both to the same surface of the upper, to burn the stitch markings in successive uppers so as to be readily visible, under the varying pressures of the marking die on the uppers of varying thicknesses incident to travel of the cutting die therethrough.

BENJAMIN W. FREEMAN.
WILLIAM S. HERSCHEL.